United States Patent [19]
Hensler et al.

[11] Patent Number: 4,790,984
[45] Date of Patent: Dec. 13, 1988

[54] PROCESS FOR PREPARING A SODIUM TRIPOLYPHOSPHATE HEXAHYDRATE POWDER

[75] Inventors: Paul L. Hensler; Mark A. Bissell, both of Lawrence, Kans.

[73] Assignee: FMC Corporation, Philadelphia, Pa.

[21] Appl. No.: 83,407

[22] Filed: Aug. 10, 1987

[51] Int. Cl.$^4$ .............................................. C01B 25/41
[52] U.S. Cl. .................................................... 423/315
[58] Field of Search ........................................ 423/315

[56] References Cited

U.S. PATENT DOCUMENTS

| | | | |
|---|---|---|---|
| 2,494,828 | 1/1950 | Munter | 252/175 |
| 2,566,424 | 9/1951 | Munter | 252/175 |
| 3,233,967 | 2/1966 | Shen | 423/315 |
| 3,309,174 | 3/1967 | Pals | 23/107 |
| 3,322,493 | 5/1967 | Pals | 23/106 |
| 3,469,938 | 9/1969 | McLeod et al. | 23/107 |
| 3,761,573 | 9/1973 | Hinz et al. | 423/315 |
| 3,770,644 | 11/1973 | Huttinger et al. | 252/135 |
| 3,852,212 | 12/1974 | Groening et al. | 252/135 |
| 4,251,498 | 2/1981 | Hensler et al. | 423/315 |
| 4,255,274 | 3/1981 | Hensler et al. | 252/135 |
| 4,394,358 | 7/1983 | Maurer et al. | 423/315 |
| 4,436,644 | 3/1984 | Johnson et al. | 252/174.13 |
| 4,734,214 | 3/1988 | Joubert | 423/315 |

OTHER PUBLICATIONS

Dolan, M. J., "A Review of Detergent Agglomeration Technology", *Soap/Cosmetics/Chemical Specialties*, Mar. 1987, pp. 33-62.

Perry et al., *Perry's Chemical Engineers' Handbook*, 6th Edition, McGraw-Hill, N.Y. (1984), pp. 8-38 to 41 and 8-60 to 61.

*Primary Examiner*—John Doll
*Assistant Examiner*—Wayne A. Langel
*Attorney, Agent, or Firm*—R. E. Elden; F. Ianno; E. G. Seems

[57] ABSTRACT

A process is provided for producing a powdered STPP hexahydrate particularly useful for use as a builder in a heavy duty detergent.

5 Claims, No Drawings

PROCESS FOR PREPARING A SODIUM TRIPOLYPHOSPHATE HEXAHYDRATE POWDER

A process is provided for preparing a sodium tripolyphosphate hexahydrate composition which can be ground such that less than 50% will be retained on a 100 mesh sieve.

Sodium tripolyphosphate (STPP) is useful as a builder in synthetic detergent formulations particularly for use in heavy duty detergents. Anhydrous grade STPP is satisfactory when the detergent is to be prepared by spray drying but usually is not employed for detergents formulated by dry mixing. A more absorbent product is required. U.S. Pat. No. 3,469,938 teaches a process to produce an absorbent (light density) granular STPP as the hexahydrate by hydrating a granular STPP containing at least 10% fines (less than 100 U.S. Standard mesh). The patent teaches the function of the fines in the process is to produce a cement when combined with the water used to hydrate the particles and produce low bulk density "granules," irregularly shaped agglomerates having a large surface area.

Recently, liquid detergents have become popular because of their convenience. STPP is insufficiently soluble in aqueous solution to provide sufficient builder activity if formulated into a true solution. However, a slurry of finely powdered STPP hexahydrate would clearly overcome this solubility problem and permit formulating a detergent slurry which could contain sufficient STPP to provide effective builder activity. In general, a composition is considered to be a powder if at least 50% of the particles by weight pass through a 100 mesh sieve.

Attempts were unsuccessful to grind the granular STPP hexahydrate produced by the process of U.S. Pat. No. 3,469,938 to a fine product substantially less than 100 mesh (U.S. Standard). It appeared that sufficient energy was required in the milling that the STPP hexahydrate in the mills was caked on the mill internals rather than being pulverized. The caked material reduced the clearances in the mills sufficiently to overload and shut the mill down.

This inability to grind STPP hexahydrate to a powder at first appears unexpected in view of U.S. Pat. No. 3,469,938. However, there the product was ground only sufficiently to reduce about 2% of the product, the +20 mesh fraction, to a −20 to +60 mesh range. There was no attempt there to produce a powder.

The present invention overcomes the problems of the prior art process by producing sodium tripolyphosphate hexahydrate powder comprising hydrating anhydrous sodium tripolyphosphate having a particle size such that at least 85% by weight is less than 100 mesh (U.S. Standard) with sufficient water to provide not more than 105% of the theoretical amount of water to form the hexahydrate, drying the sodium tripolyphosphate hexahydrate to remove substantially all of the uncombined water, maintaining said hydrating and drying steps at less than 80° C., thereby producing a sodium tripolyphosphate hexahydrate powder such that at least 50% by weight is less than 100 mesh and optionally separating the dried, hydrated sodium tripolyphosphate into a powder fraction as product and an oversize fraction.

It is unexpected that a fine powder having a particle size such that at least 85% by weight could be used as a feed to a hydrator. U.S. Pat. No. 3,469,938 discloses that the hydration reaction is exothermic, requiring means to remove the heat such as cooling with ice or by evaporation of excess water by a stream of air. However, with the feed of fine particles employed in the present invention it would be expected that extreme dust losses would make the process uneconomical or environmentally unacceptable.

In addition, U.S. Pat. No. 3,469,938 teaches that fine particles of anhydrous STPP provide the cement to form the granules. Consequently, one would expect that employing a feed comprising a fine powder, more than 85% by weight particles less than 100 mesh would result in extremely large, hard agglomerates. Further, it would be expected that the large particles would be very difficult to grind to form a fine particle because they are composed of at least 85% "cement" as a result of the fine feed employed.

Unexpectedly, it was found that employing a fine, anhydrous STPP powder as a feed resulted in a powder STPP hexahydrate product and that the particle size of the larger agglomerates in the product could be easily reduced by grinding without caking in the grinder.

It is desirable that the temperature of the STPP product be maintained at less than 80° C. during the hydrating and drying steps because it is well known that the product loses water of hydration above that temperature. As the hydration reaction is exothermic, there is no critical lower temperature provided the water of hydration is above its freezing temperature. The desired temperature is generally between 20° C. and 70° C. As used herein the term "substantially all of the uncombined water" means 2% by weight or less uncombined water.

It appears that the average particle size of the STPP hydrate produced by this process is greater than the average particle size of the anhydrous STPP employed as feed. Consequently, one skilled in the art can, without undue experimentation, determine the optimum particle size of the anhydrous STPP feed necessary to produce the desired particle size distribution of the STPP hexahydrate product. In the event that excessive large agglomerated particles are produced, it has been found that the STPP product produced here, unlike the STPP product produced by the process of U.S. Pat. No. 3,469,938, can be ground to minimize such oversize agglomerated particles so that substantially all of the product is finer than 100 mesh.

If it is desired the product STPP hexahydrate can be separated into a powder fraction and a reject fraction by conventional sieving or classification steps.

In general, it is desirable that at least 85% of the anhydrous STPP feed will have a particle size less than 100 mesh. Preferably 90% will pass through a 100 mesh sieve (be smaller than 100 mesh).

The best mode of practising the invention will be clear to one skilled in the art from the following nonlimiting examples.

COMPARATIVE EXAMPLES

Example A

STPP hexahydrate was prepared by the process of U.S. Pat. No. 3,469,938. After the hydrating and drying steps the intermediate product was screened and the oversize portion ground in a conventional hammer mill and combined as "product" with the screened product from the dryer. The particle size distribution of the feed and product are presented as Table I as % by weight.

Example B

Granular STPP hexahydrate produced by the process of U.S. Pat. No. 3,469,938, Example A, was fed to a Mikro-Pulverizer high speed hammer mill. This style mill is particularly useful for producing very fine powders. The mill became overloaded and shut down. Examination showed the STPP hexahydrate had caked on the internals.

Example C

Example B was repeated using a Raymond vertical mill having an internal air classifier. This mill is also designed for very fine grinding. The mill also became overloaded and shut down. The internals were also caked.

Inventive Example 1

Powdered anhydrous STPP was hydrated in the equipment employed in Comparative Example A. The particle size distribution of the feed and intermediate product is presented in Table II. The oversize product was milled in the same mill employed in Example A and combined as product with the screened product from the dryer. The particle size distribution of the product is also presented in Table II.

From Table II it is clear that employing fine anhydrous feed unexpectedly produced a fine powder product. Further, the oversize product could be ground without caking in a conventional hammer mill.

Inventive Example 2

Samples of STPP hexahydrate from Comparative Example A and Inventive Example 1 were subjected to a friability test.

First each sample was subjected to a five minute Rotap ® shaker through a 100 mesh screen. Weighing the amount that passes through the sieve indicated that 32% of the powder base STPP hexahydrate passed through the sieve whereas only 6% passed through for the granulated based STPP hexahydrate. Next, three one-inch diameter rubber balls were placed on top of the 100 mesh screen along with the material which did not pass through in the first step. The retained material and the balls were shaken on a Rotap ® shaker for 20 minutes. For the powder base STPP hexahydrate (Example 1), 64% of the material which remained on the screen was broken enough to pass through the 100 mesh screen. For the granule base STPP hexahydrate (Example A) only 13% was broken down by the rubber balls. Expressed differently, 82% of the STPP hexahydrate from Example A remained on the screen as compared with only 15% of the STPP hexahydrate powder from Example 1. This clearly shows that using a milled powder anhydrous STPP allows one to hydrate the STPP to powdered hexahydrate and with a minimum of milling, if any, reduce any agglomerated hydrated STPP to a highly desirable powder sizing.

TABLE I

PARTICLE SIZE OF STPP HEXAHYDRATE PRODUCT AND ANHYDROUS FEED

| | % by weight retained on U.S. mesh | | | | |
|---|---|---|---|---|---|
| | +30 | +40 | +60 | +100 | +270 |
| Feed (anhyd.) | 18.5 | 29.1 | 43.7 | 56.3 | 68.7 |
| Product (STPP hexahydrate) | 22.2 | 50.5 | 81.7 | 97.4 | 98.6 |

TABLE II

PARTICLE SIZE OF STPP ANHYDROUS FEED, HEXAHYDRATE PRODUCT AND MILLED PRODUCT

| | % by weight retained on U.S. mesh | | | | |
|---|---|---|---|---|---|
| | +30 | +40 | +60 | +100 | +270 |
| Feed (anhyd.) | 0.1 | 0.8 | 2.4 | 6.9 | 21.7 |
| Intermediate Product | 22.4 | 33.9 | 49.1 | 58.9 | 70.6 |
| Product hexahydrate | 4.5 | 16.1 | 28.7 | 38.6 | 53.2 |

We claim:

1. The method of producing sodium tripolyphosphate hexahydrate powder comprising hydrating anhydrous sodium tripolyphosphate having a particle size such that at least 85% by weight is less than 100 mesh (U.S. Standard) with sufficient water to provide not more than 105% of the theoretical amount of water to form the hexahydrate, drying the sodium tripolyphosphate hexahydrate to remove substantially all of the uncombined water and maintaining said hydrating and drying steps at less than 80° C. thereby producing a sodium tripolyphosphate hexahydrate powder such that at least 50% by weight is less than 100 mesh (U.S. Standard).

2. The process of claim 1 wherein the particle size distribution of the anhydrous sodium tripolyphosphate is such that at least 90% by weight is less than 100 mesh at least 75% is less than 270 mesh (U.S. Standard).

3. The process of claim 2 wherein the dried sodium tripolyphosphate hexahydrate is milled sufficiently to reduce the size of the larger agglomerates.

4. The process of claim 1 wherein the dried sodium tripolyphosphate hexahydrate is milled sufficiently to reduce the size of the larger agglomerates.

5. The process of claim 1 wherein the dried sodium tripolyhosphate hexahydrate is separated into a powder fraction and an oversize fraction.

* * * * *